US000001020H

United States Statutory Invention Registration [19]

[11] Reg. Number: H1020

Nishio et al.

[43] Published: Feb. 4, 1992

[54] DEVELOPING SOLUTION FOR LIGHT-SENSITIVE SILVER HALIDE PHOTOGRAPHIC MATERIAL AND METHOD OF FORMING PHOTOGRAPHIC IMAGE MAKING USE OF IT

[75] Inventors: Syoji Nishio, Hino; Kazuhiro Yoshida, Hachioji, both of Japan

[73] Assignee: Konica Corporation, Tokyo, Japan

[21] Appl. No.: 586,284

[22] Filed: Sep. 21, 1990

[30] Foreign Application Priority Data

| | | | |
|---|---|---|---|
| Sep. 25, 1989 | [JP] | Japan | 1-249577 |
| Sep. 25, 1989 | [JP] | Japan | 1-249578 |
| Oct. 30, 1989 | [JP] | Japan | 1-282469 |
| Nov. 1, 1989 | [JP] | Japan | 1-283095 |

[51] Int. Cl.[5] ..... G03C 5/24

[52] U.S. Cl. ..... 430/440; 430/445; 430/446; 430/480; 430/483; 430/486; 430/487; 430/489; 430/490

[58] Field of Search ..... 430/440, 445, 446, 480, 430/483, 486, 487, 489, 490, 567

[56] References Cited

U.S. PATENT DOCUMENTS

| | | | |
|---|---|---|---|
| 2,531,832 | 11/1950 | Stanton | 430/434 |
| 2,950,970 | 8/1960 | Schwan et al. | 430/469 |
| 3,046,129 | 7/1962 | Graham et al. | 430/377 |
| 3,201,242 | 8/1965 | Schwan et al. | 430/469 |
| 3,271,157 | 9/1966 | McBride | 430/599 |
| 3,291,607 | 12/1966 | Dersch et al. | 430/379 |
| 3,495,981 | 2/1970 | Nagae et al. | 430/372 |
| 3,671,247 | 6/1972 | Yoneyama et al. | 430/435 |
| 3,915,710 | 10/1975 | Habu et al. | 430/608 |
| 3,996,054 | 12/1976 | Santemma et al. | 430/377 |
| 4,063,951 | 12/1977 | Bogg | 430/567 |
| 4,414,305 | 11/1983 | Nakamura et al. | 430/487 |
| 4,435,500 | 3/1984 | Okutsu | 430/489 |
| 4,672,025 | 6/1987 | Yamada et al. | 430/489 |
| 4,857,445 | 8/1989 | Yoshida et al. | 430/567 |
| 4,946,772 | 8/1990 | Ogawa | 430/567 |

FOREIGN PATENT DOCUMENTS

| | | | |
|---|---|---|---|
| 207045 | 12/1983 | Japan | 430/487 |
| 1129085 | 10/1968 | United Kingdom . | |
| 1129086 | 10/1968 | United Kingdom . | |
| 1216854 | 12/1970 | United Kingdom | 430/489 |

*Primary Examiner*—Brooks H. Hunt
*Assistant Examiner*—Daniel J. Jenkins
*Attorney, Agent, or Firm*—Finnegan, Henderson, Farabow, Garrett & Dunner

[57] ABSTRACT

A developer for developing a silver halide light-sensitive material and an image forming method using the developer are disclosed. The developer contains a compound represented by the following formula I or II and a compound containing a thioether group.

(I)

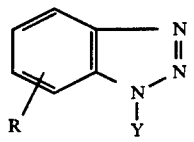

(II)

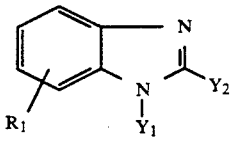

wherein Y, $Y_1$ and $Y_2$ are each a hydrogen atom or a mercapto group, and R and $R_1$ are each a substituent. A silver halide light-sensitive material containing silver halide grains comprising not less than 50 mol % of silver chloride and have a ratio of (100) surface and (111) surface of not less than 5 is preferably used in the image forming method. Developing speed and sensitivity of light-sensitive material can be rised by use of the developer.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DEVELOPING SOLUTION FOR LIGHT-SENSITIVE SILVER HALIDE PHOTOGRAPHIC MATERIAL AND METHOD OF FORMING PHOTOGRAPHIC IMAGE MAKING USE OF IT

FIELD OF THE INVENTION

The present invention relates to a developing solution for a light-sensitive silver halide photographic material. More particularly, it relates to a developing solution capable of accelerating development to increase sensitivity or speed when developing is carried out, and a method of forming a photographic image making use of the developing solution.

BACKGROUND OF THE INVENTION

In the development of light-sensitive silver halide photographic materials, it is desired to accelerate the rate of development and to increase speed without degrading anti fogging properties or graininess of the light-sensitive silver halide photographic materials. For such purposes, methods for the acceleration of development have been hitherto proposed in a large number. Well known as compounds capable of accelerating development by their addition in developing solutions are polyalkylene oxide compounds as exemplified by the compounds as disclosed in U.S. Pat. Nos. 2,531,832, 2,950,970, 3,291,607, 3,495,981, 3,671,247, 3,915,710 and 3,996,054, etc.; thioether compounds as exemplified by the compounds as disclosed in U.S. Pat. Nos. 3,046,129, 3,201,242 and 3,271,157, British Patents No. 1,129,085 and No. 1,129,086, Japanese Patent Publication Open to Public Inspection (hereinafter referred to as Japanese Patent O.P.I. Publication) No. 207045/1983, etc.; and also onium and polyonium compounds of an ammonium, phosphonium or sulfonium type. Most of these development accelerators, however, tend to increase fog of a light-sensitive photographic material and even to make its graininess rough. In addition, some of them have the disadvantage that they bring about a poor running stability of developer. Under such existing circumstances, they have been little put into practical use.

On the other hand, there is a method in which these development accelerators are incorporated into light sensitive silver halide photographic materials so that the speed can be increased. In such an instance, however, the storage stability of light-sensitive silver halide photographic materials may be deteriorated, causing, in particular, the problem of an increase in fog with time.

SUMMARY OF THE INVENTION

To cope with the above problems, a first object of the present invention is to provide a novel developing solution for a light-sensitive silver halide photographic material, that may cause less increase in fog, can increase the rate of development and can achieve an increase of speed, and a method of forming a photographic image making use of such a developing solution.

A second object of the present invention is to provide a developing solution for a light-sensitive silver halide photographic material, that can give a superior running stability and can achieve an increase in effective speed, and a method of forming a photographic image making use of such a developing solution.

The above objects can be achieved by a developing solution for a light-sensitive silver halide photographic material, comprising a developing agent, a thioether compound and a compound represented by the following Formula I or II.

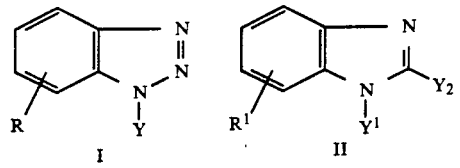

In Formulas I and II, Y, $Y_1$ and $Y_2$ each represent a hydrogen atom or a mercapto group; R and $R_1$ each represent a hydrogen atom, a halogen atom, a nitro group, an amino group, a cyano group, a hydroxyl group, a mercapto group, a sulfo group, a substituted or unsubstituted alkyl group, a substituted or unsubstituted alkenyl group, a substituted or unsubstituted alkynyl group, a substituted or unsubstituted aryl group, a substituted or unsubstituted alkoxy group, a hydroxycarbonyl group, an alkyl carbonyl group or an alkoxy carbonyl group.

The light-sensitive silver halide photographic material used in the method of forming a photographic image making use of the above developing solution comprises a silver halide grain having an area ratio of (100) face to (111) face of not less than 5.

DETAILED DESCRIPTION OF THE INVENTION

Typical examples of the compound represented by Formula I or II are shown below, but by no means limited to these.

Compounds represented by Formula I

I-1: Benzotriazole
I-2: 5-Methylbenzotriazole
I-3: 5-Chlorobenzotriazole
I-4: 5-Nitrobenzotriazole
I-5: 5-Ethylbenzotriazole
I-6: 5-Carboxybenzotriazole
I-7: 5-Hydroxybenzotriazole
I-8: 5-Aminobenzotriazole
I-9: 5-Sulfobenzotriazole
I-10: 5-Cyanobenzotriazole
I-11: 5-Ethoxybenzotriazole
I-12: 5-Ethoxybenzotriazole
I-13: 5-Mercaptobenzotriazole Compounds represented by Formula II II-1: 5-Benzimidazole
II-2: 5-Sulfobenzimidazole
II-3: 5-Methoxybenzimidazole
II-4: 5-Chlorobenzimidazole
II-5: 5-Nitrobenzimidazole
II-6: 2-Mercapto-5-sulfobenzimidazole These compounds are known as antifoggants in the field of photography, and can be synthesized by known synthesis methods. Some of the compounds are commercially available as chemical reagents.

The compound represented by Formula I or II may preferably be added in an amount of from 0.0001 to 2 g per liter of the developing solution.

The thioether compound used in the present invention may be any of the thioether compounds disclosed in the patent publications previously set out, but may preferably be a compound represented by the following Formula III.

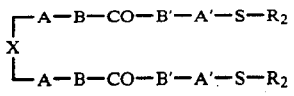

Formula III wherein A represents an alkylene group having 1 to 3 carbon atoms, or a polyalkylene ether group which is a group represented by $-(CH_2CH_2O)_p-$, $-(CH_2CH_2O)_p-CH_2CH_2-$ or

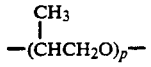

and not linked to B through an oxygen atom. A′ represents an alkylene group having 1 to 3 carbon atoms, or a polyalkylene ether group represented by $-(CH_2CH_2)_p-CH_2CH_2-$ or

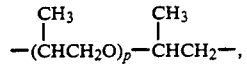

provided that A and A′ are not polyalkylene ether groups at the same time. The letter symbol p is an integer of 2 to 30.

B and B′ each represent —NH— or —O—, provided that B and B′ are not —O—'s at the same time.

$R_2$ represents an alkyl group having 1 to 3 carbon atoms, a phenyl group, an aralkyl group or $-(CH_2)_q-COOR'$, where q represents an integer of 1 to 3.

R′ represents an alkyl group having 1 to 3 carbon atoms.

X represents a divalent group selected from —S—, —O—, $-CH_2-$,

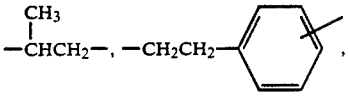

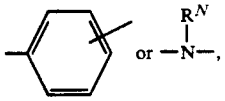

where $R^N$ represents an alkyl group having 1 to 3 carbon atoms.

Typical examples of the compound of the present invention are shown below. The compound of the present invention is by no means limited to these.

Exemplary Compounds:

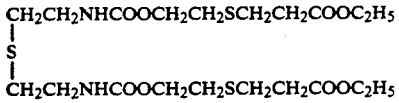

III-1

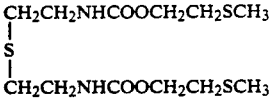

III-2

-continued

Exemplary Compounds:

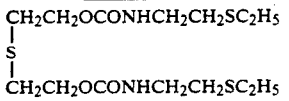

III-3

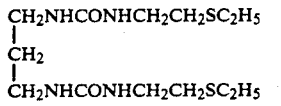

III-4

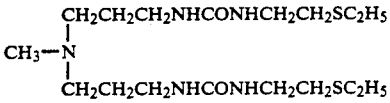

III-5

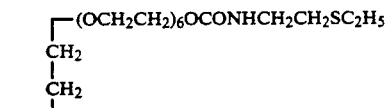

III-6

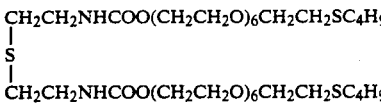

III-7

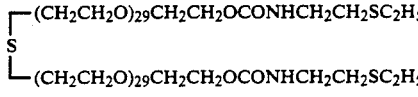

III-8

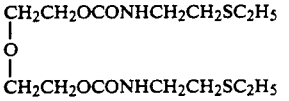

III-9

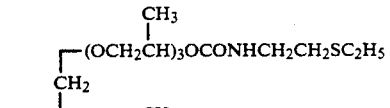

III-10

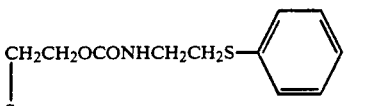

III-11

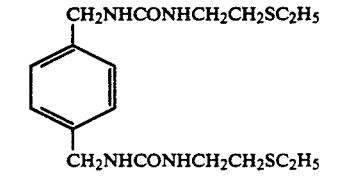

III-12

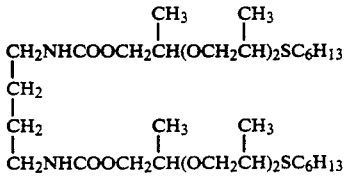

III-13

-continued

Exemplary Compounds:

III-14

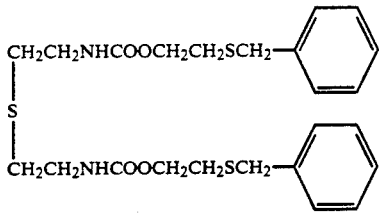

In the present invention, when the compound of Formula III is added in the developing solution, it may preferably be added in an amount of from 0.0001 to 2 g, and particularly from 0.001 to 1 g, per liter of the developing solution.

The developing agent according to the present invention is used as a liquid developer, i.e., a developing solution. A black and white developing agent used in the developing solution includes dihydroxybenzenes as exemplified by hydroquinone, chlorohydroquinone, isopropylhydroquinone, 2,3-dichlorohydroquinone and 2,5-dimethylhydroquinone, 3-pyrasolidones as exemplified by 1-phenyl-3-pyrazolidone, 1-phenyl-4-methyl-4-hydroxymethyl-3-pyrazolidone and 1-phenyl 4-methyl-3-pyrazolidone, aminophenols as exemplified by o-aminophenol, p-aminophenol and N-methyl-p-aminophenol, pyrogalol, ascorbic acid, 1-aryl-3-pyrazolidones as exemplified by 1-(p-hydroxyphenyl)-3-aminopyrazolidone, which may be used alone or in combination.

A black and white developing solution according to the present invention may contain an alkali agent usually used in the developing solution of the above black and white developing agent, which alkali agent is as exemplified by sodium hydroxide, potassium hydroxide, ammonium hydroxide, sodium carbonate, potassium carbonate, tertiary phosphate, secondary phosphate, sodium sulfate, sodium metaborate, and borax. It may further contain an alkali halide as exemplified by potassium bromide, or citrazinic acid or the like as a development regulator, a sulfite or the like as a preservative, and, as a chelating agent, a phosphate such as polyphosphate, an aminopolycarboxylic acid such as nitrilotriacetic acid or 1,3-diamino 2-propanoltetraacetic acid, an oxycarboxylic acid such as citric acid or gluconic acid or an organic phosphonic acid such as 1-hydroxyethylidiene-1,1-disulfonic acid or aminotri(methylenephosphonio acid).

The black and white developing solution may also contain a developer hardening agent as exemplified by glutaldehyde, α-methylglutaldehyde, maleicdialdehyde, succinicaldehyde, methylmaleicaldehyde, α,α-dimethylglutaldehyde, and an addition compound of any of these with sodium bisulfite. It may further contain a conventionally known development accelerator.

As a silver halide contained in a silver halide emulsion layer of the light-sensitive material to be developed with the developing solution of the present invention, any of silver halides such as silver bromide, silver chloride, silver iodobromide, silver chlorobromide and silver chloroiodobromide can be used, which are used in usual silver halide emulsions. The silver halide may preferably contain 50 mol % or more of silver chloride, and may preferably have a grain size of 0.2 μm or more and 0.5 μm or less. On the side of the emulsion layer, gelatin may be contained in an amount of not more than 2.8 g/m$^2$, and preferably not more than 2.5 g/m$^2$.

Silver halide grains may be any of those obtained by the acidic method, the neutral method or the ammoniacal method.

The silver halide grains may be those having a uniform distribution of silver halide composition in a grain, or core/shell grains having different composition between the inner part and surface layer of a grain. They may be grains in which a latent image is mainly formed on the surface of a grain, or those in which a latent image is mainly formed in the inner part of a grain.

The silver halide grains according to the present invention may have any form. They may preferably contain a silver halide grain having an area ratio of (100) face to (111) face of not less than 5 at the surface thereof.

The silver halide photographic emulsion grains with an area ratio of (100) face to (111) face of not less than 5 can be prepared by various methods. In general, they can be preferably prepared by what is called controlled double-jet precipitation, which is a method in which an aqueous silver nitrate solution and an aqueous alkali halide solution are simultaneously added at a rate so selected as to be higher than the rate of dissolution of grains and also achieve little renucleation, while keeping the pAg value to a given value of not more than 8.10 during the formation of grains. The pAg value is more preferably controlled to be not more than 7.80. When the formation of silver halide grains is divided into two processes, the formation of nuclei and the growth of nuclei, there are no particular limitations on the pAg value at the time Of the formation of nuclei, and the pAg value at the time of the growth of nuclei may preferably be controlled to be not more than 8.10, and more preferably not more than 7.80. The face area ratios can also be controlled by Ostwald ripening. It is also possible to use various restrainers or dyes for regulating crystal habits when grains are formed. The reaction between a soluble silver salt and a soluble halide salt may be carried out in the form of single jet precipitation. Double jet precipitation is preferred in order to obtain a good monodispersibility.

It is also possible to prepare grains having a crystal form such as an octahedron, a tetradecahedron or a dodecahedron, using the methods as described in U.S. Pat. Nos. 4,183,756 and 4,225,666, Japanese Patent Publication Open to Public Inspection (hereinafter referred to as Japanese Patent O.P.I. Publication) No. 26589/1980, Japanese Patent Examined Publication No. 42737/1980, and The Journal of Photographic Science (J. Photgr. Sci.) 21, 39(1973), and use the resulting grains. Grains having a twin plane may also be used.

The area ratio of (100) face to (111) face of a silver halide grain can be measured by Kubelka-Munk's dye adsorption method. In this method, used is a dye that is preferentially adsorbed either on the (100) face or on the (111) face and gives a spectrometrically different state of aggregation between the dye adsorbed on the (100) face and the dye adsorbed on the (III) face. The area ratio of (100) face to (111) face can be determined by detailed spectrometry with respect to the amounts of dyes added.

Detailed proportions of the (100) face on the surface of a silver halide grain can be determined by the method as disclosed in Tadaaki Tani, "Identification of Crystal Phases of Silver Halide Grains in Photographic Emulsions That Utilizes Adsorption of Dyes", Journal of Chemical Society of Japan, 6, 942–946 (1984).

The silver halide grains relating to the present invention may comprise grains having a single form, or may comprise a mixture of grains having various forms.

Emulsions having any grain size distribution may be used. An emulsion having a broad grain size distribution, called a polydisperse emulsion, may be used, or an emulsion having a narrow grain size distribution, called a monodisperse emulsion, may be used alone or in the form of a mixture of several kinds. Alternatively, the polydisperse emulsion and the monodisperse emulsion may be used in a mixed form.

The silver halide emulsion may be used in the form of a mixture of two or more silver halide emulsions separately formed.

In the method of the present invention, a monodisperse emulsion is preferred. Silver halide grains monodispersed in the monodisperse emulsion may preferably be those in which the weight of silver halide grains included within the grain size range of ±20% around the average grain size r holds not less than 60%. particularly preferably not less than 70%, and more preferably not less than 80%, based on the total weight of silver halide grains.

Here, the average grain size $\bar{r}$ is defined to be a grain size ri determined when $ni \times ri^3$, the product of frequencies ni and $ri^3$ of grains having a grain size ri, comes to be maximum. The effective number is three figures, and a minimum figure number is round off.

In the present specification, the grain size is based on based on the diameters of grains in the case of spherical silver halide grains, and, in the case of grains with shapes other than the spherical shape, the diameters obtained when a projected image of the grain is calculated into a circular image having the same area.

The grain size can be obtained, for example, by photographing the grains under 10,000 to 50,000 magnifications by means of an electron microscope, and actually measuring the diameters or projected areas of grains on the print. Number of grains to be measured should be not less than 1,000 at random.

A highly monodisperse emulsion, particularly preferred in the method of the present invention, has a degree of monodispersion of not more than 20, and more preferably not more than 15, when it is defined by the expression:

$$\frac{\text{Grain size standard deviation}}{\text{Average grain size}} \times 100 = \text{Degree of monodispersion}$$

Here, the average grain size and the grain size standard deviation is determined from the above definition. The monodisperse emulsion can be obtained by making reference to, for example, Japanese Patent O.P.I. Publications No. 48521/1979, No. 49938/1983 and No. 122935/1985.

A light-sensitive silver halide emulsion may not be chemically sensitized and can be used as it stands as what is called a primitive emulsion. In usual instances, it is chemically sensitized. In order to carry out chemical sensitization, it is possible to use the method as disclosed in Glafkides, or Zelikman et al's writings, or H. Frieser, Die Gundlagen der Photographischen Prozesse mit Silberhalogeniden, Akademische Verlagsgesellschaft, 1968.

More specifically, it is possible to use sulfur sensitization in which a compound containing sulfur capable of reacting with silver ions or an active gelatin is used, reduction sensitization in which a reducing substance is used, and noble metal sensitization in which gold or other noble metal is used.

There are no particular limitations on the conditions such as pH, pAg and temperature when chemical sensitization is carried out. The pH value may preferably be 4 to 9, and particularly 5 to 8. The pAg value may preferably be kept at 5 to 11, and particularly 7 to 9. The temperature may preferably be 40° to 90° C., and particularly 45° to 75° C.

In the silver halide emulsion used in the present invention, the above sulfur sensitization, the gold-sulfur sensitization, as well as the reduction sensitization that uses a reducing substance and the noble metal sensitization that uses a noble metal compound can be used in combination.

As a light sensitive emulsion, a single kind of emulsion may be used alone, or two or more kinds of emulsions may be mixed. At least one of them may preferably contain the grain having an area ratio of (100) face to (111) face of not less than 5.

Various stabilizers can be used after completion of the chemical sensitization described above, which stabilizers include, for example, 4-hydroxy-6-methyl-1,3,3a,7-tetrazaindene, 5-mercapto-1-phenyltetrazole, and 2-mercaptobenzothiazole. It is also possible to optionally further use a silver halide solvent such as thioether, or a crystal habit modifier such as a mercapto group-containing compound or a sensitizing dye.

To the silver halide grains used in the emulsion, metal ions may be added using a cadmium salt, a zinc salt, a lead salt, a thallium salt, an iridium salt or its complex salt, a rhodium salt or its complex salt, or an iron salt or its complex salt in the course of the formation of grains and/or in the course of the growth of grains so that the metal ions can be incorporated in the inner part and/or the surface of a grain.

Excess soluble salts may be removed from the emulsion of the present invention after completion of the growth of silver halide grains, or may remain unremoved. When the salts are removed, they can be removed according to the method as disclosed in Research Disclosure No. 17643.

In the emulsion, a sensitizing dye may further be added and used in combination. Usable dyes include cyanine dyes, merocyanine dyes, composite cyanine dyes, composite merocyanine dyes, holopolar cyanine dyes, hemicyanine dyes, styryl dyes, and hemioxanol dyes.

The sensitizing dye may be used in substantially the same concentration as used in usual negative silver halides. In particular, the sensitizing dye can be advantageously used in such a concentration that may not substantially lower the inherent sensitivity of a silver halide emulsion. The sensitizing dye may preferably be used in a concentration of from about $1.0 \times 10^{-5}$ mol to about $5 \times 10^{-4}$ mol per mol of silver halide, and particularly preferably be used in a concentration of from about $4.0 \times 10^{-5}$ mol to about $2 \times 10^{-4}$ mol per mol of silver halide.

The sensitizing dye of the present invention can be used alone or in combination of two or more kinds. When the sensitizing dyes are used in combination, they are often used for the purpose of super sensitization.

The light-sensitive silver halide photographic material relating to the present invention may contain in its hydrophilic colloidal layer a water-soluble dye as a filter dye or for the purposes of anti-irradiation, antihalation and others. Such a dye includes oxonol dyes, hemioxonol dyes, styryl dyes, merocyanine dyes, cyanine dyes, and azo dyes. In particular, oxonol dyes, hemioxanol dyes and merocyanine dyes are useful.

In instances in which dyes or ultraviolet absorbents are contained in the hydrophilic colloid layer of the light-sensitive silver halide photographic material, they may be mordanted with a cationic polymer or the like.

The above photographic emulsion may be incorporated with various compounds for the purpose of preventing a lowering of sensitivity or generation of fog in the course of preparation, during storage or in the course of processing, of light-sensitive materials.

The light-sensitive silver halide photographic material may also contain in its photographic component layer the alkyl acrylate latex as disclosed in U.S. Pat. Nos. 3,411,911 and 3,411,912, Japanese Patent Examined Publication No. 5331/1970, etc.

In the light-sensitive material, various additives can be further used depending on the purpose. These additives are more detailed in Research Disclosures Vol 176, Item 17643 (December, 1978) and Vol. 187, Item 18716 (November, 1976). Corresponding passages thereof are summarized in the following table.

| Type of additives | RD 17643 | RD 18716 |
|---|---|---|
| 1. Chemical sensitizer | p.23 | p.648, right col. |
| 2. Speed-increasing agent | | p.648, right col. |
| 3. Spectral sensitizer Supersensitizer | pp.23–24 | p.648, right col. to p.649, right col. |
| 4. Brightening agent | p.24 | |
| 5. Antifoggant and stabilizer | pp.24–25 | p.649, right col. |
| 6. Light-absorbent Filter dye Ultraviolet absorbent | pp.25–26 | p.649, right col. to p.650, left col. |
| 7. Anti-stain agent | p.25, right col. | p.650, left col. to right col. |
| 8. Dye-image stabilizer | p.25 | |
| 9. Hardening agent | p.26 | p.651, left col. |
| 10. Binder | p.26 | p.651, left col. |
| 11. Plasticizer, lubricant | p.27 | p.650, right col. |
| 12. Coating aid Surfactant | pp.26–27 | p.650, right col. |
| 13. Antistatic agent | p.27 | p.650, right col. |

The light-sensitive material may be comprised of, for example, emulsion layers and other photographic component layers coated on one side or both sides of a flexible support usually used in light sensitive materials. Useful as the flexible support are a film comprising a semi-synthetic or synthetic polymer such as cellulose nitrate, cellulose acetate, cellulose acetate butyrate, polystyrene, polyvinyl chloride, polyethylene terephthalate, or polycarbonate, and a paper coated or laminated with a baryta layer or an α-olefin polymer as exemplified by polyethylene, polypropylene or an ethylene/butene copolymer. The support may be colored using a dye or pigment. It may be black for the purpose of light shading. The surface of such a support may usually be under-coated so that its adhesion to an emulsion layer can be improved. The under coating may preferably be carried out by the treatment as disclosed in Japanese Patent O.P.I. Publications No. 104913/1977, No. 18949/1984, No. 19940/1984 and No. 11941/1984.

The surface of the support may be subjected to corona discharging, ultraviolet irradiation, flame treating, etc. before or after the under coating.

In the light-sensitive material, an emulsion layer or other hydrophilic colloid layer can be coated on the support or other layer by various coating methods such as dip coating, roller coating, curtain coating and extrusion coating.

The developing in the present invention is carried out in a development time of 20 seconds or less, and preferably 15 seconds or less.

The pH of the developing solution of the present invention may preferably be in the range of from 9 to 13, and more preferably in the range of from 9.5 to 12.

An alkali agent for setting the pH includes pH adjustors such as sodium hydroxide, potassium hydroxide, sodium carbonate, potassium carbonate, sodium tertiary phosphate, and potassium tertiary phosphate.

A buffer may also be used, including those disclosed in Japanese Patent O.P.I. Publication No. 28708/1986 (borates), Japanese Patent O.P.I. Publication No. 3439/1985, for example, sucrose, acetoxime, and 5-sulfosalicylic acid, phosphates, and carbonates.

In the present invention, the terms "developing time" and "fixing time" refer to the time from which a light-sensitive material to be processed is immersed in a developing tank of an automatic processor and before which it is immersed in the next fixing solution, and the time from which it is immersed in a fixing tank and before which it is immersed in the next washing tank or a stabilizing solution, respectively.

The term "washing time" refers to the time during which the light-sensitive photographic material to be processed is immersed in a washing tank.

The term "drying time" refers to the time during which the light sensitive material to be processed is held in a drying zone, which is provided in the automatic processor and in which a hot wind of usually from 35° C. to 100° C., and preferably from 40° C. to 80° C., is blown to the light-sensitive material.

The developing may preferably be carried out at a temperature of from about 25° C. to about 50° C. and for a period of time of not more than 15 seconds, and more preferably from 30° C. to 40° C. and 6 seconds to 15 seconds.

The fixing solution may preferably be an aqueous solution containing a thiosulfate and having a pH of 3.8 or more, and more preferably 4.2 to 5.5.

The fixing solution contains a fixing agent including sodium thiosulfate and ammonium thiosulfate, and commonly contains thiosulfate ions and ammonium ions. Ammonium thiosulfate is particularly preferred from the viewpoint of a fixing speed. The amount of the fixing agent used may be appropriately varied, and may commonly range from 0.1 to 0.6 mol/l in approximation.

The fixing solution may contain a water-soluble aluminum compound that acts as a hardening agent. Such a compound includes, for example, aluminum chloride, aluminum nitrate, and potassium alum.

The fixing solution may also contain tartaric acid, citric acid or a derivative of each of them, which may be used alone or in combination of two or more kinds. These compounds ma be effective when contained in an amount of not less than 0.005 mol per liter of the fixing solution, and particularly effective when contained in an amount of from 0.01 mol/l to 0.03 mol/l.

They specifically include tartaric acid, potassium tartarate, sodium tartarate, sodium potassium tartarate, citric acid, sodium citrate, potassium citrate, lithium citrate, and ammonium citrate.

The fixing solution may optionally contain a preservative as exemplified by a sulfite and a bisulfite, a pH buffer as exemplified by acetic acid and nitric acid, a pH adjuster as exemplified by sulfuric acid, a chelating agent having a water softening ability.

Fixing may preferably be carried out ar a temperature of from about 20° C. to about 50° C. and for a period of time of from 6 seconds to 1 minute, more preferably from 30° C. to 40° C. and 6 seconds to 30 seconds, and still more preferably from 30° C. to 40° C. and 6 seconds to 15 seconds.

In an instance in which a concentrated fixing solution is replenished together with its diluting water with progress of the processing of a light-sensitive photographic material in an automatic processor, the concentrated fixing solution is most preferably comprised of one agent, like the case of the developing solution.

A fixing stock solution comprised of one agent can be stable when its pH is not less than 4.5, and more preferably not less than 4.65. A solution of pH less than 4.5 tends to cause decomposition of a thiosulfate, which finally results in precipitation of sulfur or a sulfide, particularly when the solution is left to stand for a long period of time before it is actually used as a fixing solution. Hence, in the pH range of not less than pH 4.5, sulfite gas can be less generated and also work environment can be improved. The upper limit of the pH is not so strict. However, once the fixing is carried out at an excessively high pH, the film pH may increase even if washing is carried out thereafter, resulting in a large film swell and hence a large drying burden. Thus, the upper limit should be about pH 7. In the case when an aluminum salt is used in the fixing solution and a gelatin layer is thereby hardened, the upper limit of the pH is 5.5 for the purpose of preventing deposition and precipitation of the aluminum salt.

In the present invention, the developing solution or fixing solution may be what is called a tank solution, which requires no diluting water as described above, in other words, can be replenished in the form of a stock solution as it is.

The feed of each concentrated solution to a processing tank solution and the mixing proportion thereof to diluting water can be variously changed depending on the composition of a concentrated solution. In general, the concentrated solution and the diluting water may be in a proportion of 1:0 to 8, and the total amount of each of these developing solution and fixing solution may preferably be in the range of from 50 ml to 1,500 ml per 1 $m^2$ of a light-sensitive material.

In the present invention the light-sensitive material, having been subjected to developing and fixing, is further subjected to washing or stabilizing.

The washing or stabilizing can be carried out by the application of all methods known in the present field. Water that contains various additives known in the present field can also be used as washing water or stabilizing solution. Water to which a mildew proofing means has been applied may be used as the washing water or stabilizing solution. This not only makes it possible to carry out water-saving processing such that water may be replenished in an amount of not more than 3 l per 1 $m^2$ of a light-sensitive material, but also makes it unnecessary to provide piping for the installation of an automatic processor and further makes it possible to reduce stock tanks. More specifically, diluting water for preparing a developing solution and a fixing solution and the washing water or the stabilizing solution can be fed from one stock tank used in common, so that the automatic processor can be made more compact.

The water to which a mildew proofing means has been applied may be used in combination with the washing water or stabilizing solution. This enables effective prevention of fur from being formed. Hence, it is possible to carry out water saving processing in which water is used in an amount of from 0 to 3 l, and preferably from 0 to 1 l, per 1 $m^2$ of a light-sensitive material.

Here, the instance in which water is replenished in an amount of zero l refers to an instance in which no water is replenished at all except that water is appropriately replenished only in the amount corresponding to the decrease due to natural evaporation or the like of the washing water in a washing tank, in other words, an instance in which what is called "standing water" processing, where substantially no watter is replenished, is carried out.

As a method by which the amount of replenishment is saved, a cascaded or multiple stage counter-current system, for example, two stages or three stages is known in the art from old times. Application of this multiple stage counter-current system to the present invention facilitates more efficient washing, because a light-sensitive material in the fixing solution can be processed in successive contact with processing solutions in the direction where they are kept cleaner, i.e., with processing solutions not contaminated by the fixing solution. This makes it possible to appropriately remove unstable thiosulfates or the like to cause less color change or fading, so that more remarkable stabilization effect can be obtained. The washing water can also be made very small in quantity, compared with a conventional method.

When washing is carried out using a small amount of water, it is more preferred to provide the squeesee roller washing tank as disclosed in Japanese Patent O.P.I. Publication No. 32460/1987.

Part or the whole of a solution resultingly overflowed from a washing or stabilizing bath when the washing or stabilizing bath is replenished as processing proceeds, with the water to which a mildew proofing means has been applied, can be utilized as a processing solution having a fixing ability, used in the preceeding processing step, as disclosed in Japanese Patent O.P.I. Publication No. 235133/1985. Thus, the above stock water can be saved and moreover waste liquor can be more decreased. This is hence more preferred.

The mildew proofing means that can be used includes the ultraviolet irradiation method as disclosed in Japanese Patent O.P.I. Publication No. 263939/1985, the method in which a magnetic field is used, as disclosed in Japanese Patent O.P.I. Publication No. 263940/1985, the method in which water is purified using an ion exchange resin, as disclosed in Japanese Patent O.P.I. Publication No. 131632/1986, and the method in which a mildew proofing agent is used, as disclosed in Japanese Patent O.P.I Publications No. 115154/1987, No. 153952/1987, No. 220951/1987 and No. 209532/1987.

It is possible to use in combination, the microbiocide, mildew proofing agent, surface active agent, etc. as disclosed in L. E. West, Water Quality Criteria, Photo Sci. & Eng., Vol. 9, No. 6 (1965); M. W. Beach, Miorobiological Growth in Motion-Picture Processing, SMPTE Journal, Vol. 85 (1976); R. O. Deegan, Photo Processing Wash Water Biocides, J. Imaging Tech., Vol. 10, No. 6 (1984); and Japanese Patent O.P.I. Publications No. 8542/1982, No. 58143/1982, No 105145/1983, No. 132146/1982, No. 18631/1983, No. 97530/1982 and No. 157214/1982.

In the washing bath, it is also possible to use as a microbiocide in combination, the isothiazoline compound as disclosed in R. T. Kreiman, J. Image. Tech., 10, (6) 242 (1984), the isothiazoline compound as disclosed in Research Disclosure, Vol. 205, Item 20526 (May, 1981), the isothiazoline compound as disclosed in the ditto, Vol. 228, Item 22845 (April, 1983), and the compound as disclosed in Japanese Patent O.P.I. Publication No. 209532/1987.

Examples of the mildew proofing agent are phenol, 4-chlorophenol, pentachlorophenol, cresol, o-phenylphenol, chlorophene, dichlorophene, formaldehyde, glutaldehyde, chloroacetamide, p-hydroxybenzoic acid esters, 2-(4-thiazoline)-benzimidazole, benzoisothiazolin-3-one, dodecyl-benzyl-dimethylammonium chloride, N-(fluorodichloromethylthio)-phthalimide, and 2,4,4'-trichloro-2'-hydroxydiphenyl ether.

The water to which a mildew proofing means has been applied and held in a water stock tank is added as the diluting water for the processing stock solutions such as the developing solution and the fixing solution, and may preferably be added in an amount of from 0.01 to 10 g/l, and more preferably from 0.1 to 5 g/l.

Various surface active agents can also be added in the washing water in addition to a silver image stabilizing agent, for the purpose of preventing a wetting nonuniformity. Any of cationic, anionic, nonionic or amphoteric types can be used as the surface active agents. Examples of the surface active agents are the compounds as disclosed, for example, in "KAIMENKASSEIZAI HANDOBUKKU (Surfactant Handbook)", published by Kogaku Tosho K.K.

In the above stabilizing bath, various compounds can be added for the purpose of stabilizing an image. They typically include, for example, various buffers used for adjustment of pH in the photographic layers of the light-sensitive material, e.g., pH 3 to 8, such as a borate, a metaborate, borax, phosphate, a carbonate, a potassium hydroxide, sodium hydroxide, ammonia water, monocarboxylic acid, a dicarboxylic acid, a polycarboxylic acid, which are used in suitable combination, and aldehydes such as formalin. Besides, various additives such as a chelating agent, a fungicide such as a thiazole type, an isothiazole type, a halogenated phenol, sulfanylamide or benzotriazole, a surface active agent, a fluorescent brightening agent, and a hardening agent may be used. Compounds of the same or different objects may also be used in combination of two or more kinds.

In order to improve an image storage stability, it is preferred to add as a pH adjustor of processing solutions an ammonium salt of various types, such as ammonium chloride, ammonium nitrate, ammonium sulfate, ammonium phosphate, ammonium sulfite or ammonium thiosulfate to control the pH in the processed photographic layers of a light-sensitive material.

The washing or stabilizing according to the above method may preferably be carried out at a temperature of from 0° C. to 50° C. and for a period of time of from 6 seconds to 1 minute, more preferably from 15° C. to 40° C. and from 6 seconds to 30 seconds, and still more preferably from 15° C. to 40° C. and from 6 seconds to 15 seconds.

In the method of the present invention, a photographic material having been subjected to development, fixing and washing is preferably dried after complete removal of washing water, i.e., after roller squeegeeing. The drying can be carried out at about 40° C. to about 100° C. Drying time may be appropriately varied depending on the condition of surroundings. In usual instances, the drying may be carried out for about 5 seconds to 1 minute, and preferably at 40° C. to 80° C. for about 5 seconds to 30 seconds.

In the present invention, a more desirable effect can be obtained such that the drying time can be shortened with a decrease in the swelling percentage of a light-sensitive photographic material.

According to the present invention, the processing time, what is called a dry-to-dry time, ranging from the developing to the fixing, the washing and the drying, may preferably be not longer than 100 seconds, more preferably not longer than 60 seconds, and still more preferably not longer than 50 seconds.

Here, the "dry-to-dry" time refers to the time from the instant at which the head of a light-sensitive material to be processed enters a film inlet of an automatic processor, to the instant at which the head of the light sensitive material having been processed emerges from the automatic processor.

Black and white light-sensitive materials to which the developing solution containing the compound of the present invention may be any of commonly available light-sensitive silver halide photographic materials such as black and white light-sensitive photographic materials for ordinary photographying, light-sensitive photographic materials for X-rays, light-sensitive photographic materials for graphic art, light-sensitive photographic materials for medical use, light-sensitive photographic material for motion pictures, light-sensitive photographic materials for aerial photography, and light-sensitive photographic materials for TV.

EXAMPLES

The effect of the present invention will be exemplified below by giving Examples.

EXAMPLE 1

A graphic art film comprising a support coated with a silver chlorobromide emulsion was exposed to light through a contact screen according to usual sensitometry. The exposed film was developed at 38° C. for 13 seconds using a developing solution 1 having the following composition and to which the compound represented by Formula I as shown in Table 1 was added.

The emulsion used in the film was comprised of silver chlorobromide grains containing 75 mol % of silver chloride and the grain had an area ratio of (100) face to (111) face of 98:2.

| Developing solution 1 | |
|---|---|
| Potassium sulfite | 60 g |
| Sodium ethylenediaminetetraacetate | 2 g |
| Potassium hydroxide | 10.5 g |
| Diethylene glycol | 25 g |
| 1-Phenyl-4,4-dimethyl-3-pyrazolidinone | 0.3 g |
| 1-Phenyl-5-mercaptotetrazole | 0.06 g |
| Potassium bromide | 3.5 g |
| Hydroquinone | 20 g |
| Potassium carbonate | 15 g |

-continued

| Developing solution 1 | |
|---|---|
| Compound of Formula I | as shown in Table 1 |

Made up to 1 l by adding pure water (ion-exchanged water).

Subsequently, a developing solution was prepared by adding in the developing solution 1 the thioether compound of Formula III as shown in Table 1. The developing solutions thus prepared all had a pH ranging from 10.7 to 10.8.

Fixing was carried out using the following fixing solution.

| Formulation of fixing solution | |
|---|---|
| (Composition A) | |
| Ammonium thiosulfate (an aqueous 72.5% w/v solution) | 240 mΩ |
| Sodium sulfite | 17 g |
| Sodium acetate trihydrate | 6.5 g |
| Boric acid | 6 g |
| Sodium citrate trihydrate | 8 g |
| Acetic acid (an aqueous 90% w/v solution) | 13.6 mΩ |
| (Composition B) | |
| Pure water (ion-exchanged water) | 17 mΩ |
| Sulfuric acid (an aqueous 50% w/v solution) | 4.7 g |
| Aluminum sulfate (an aqueous 8.1% w/v solution in terms of $Al_2O_3$) | 26.5 g |

In use of the fixing solutions, the above Composition A and Composition B were dissolved in this order in 500 ml of water, and made up to 1 l. This fixing solution had a pH of about 4.3.

Results obtained by sensitometry are shown in Table 1. The sensitivity or speed is expressed as a relative speed regarding as 100 the speed obtained using the developing solution No. 1-2 shown in Table 1.

Running stability was evaluated by processing 50 sheets per day of exposed films of 508 mm×610 mm in size and measuring photographic performance at the time the processing was started, on 7th day, and on 14th day.

Halftone dot quality was visually evaluated according to five grades, where "5" indicates the best, and "1", the worst in quality. As halftone dots for lithography, the grades "5" and "4" are feasible for practical use; "3", a lower limit for practical use; and "2" and "1", infeasible for practical use.

TABLE 1

| Developing solution | Compound of Formula I | | Compound of Formula III | | Speed | | | Fog | | | Dot quality | | | |
|---|---|---|---|---|---|---|---|---|---|---|---|---|---|---|
| | No. | Amount mg/Ω | No. | Amount mg/Ω | Start day | 7th day | 14th day | Start day | 7th day | 14th day | Start day | 7th day | 14th day | Remarks |
| 1-1 | — | — | — | — | 110 | 110 | 110 | 0.11 | 0.11 | 0.11 | 4 | 4 | 4 | X |
| 1-2 | I-1 | 150 | — | — | 100 | 102 | 103 | 0.05 | 0.05 | 0.06 | 3 | 3 | 4 | X |
| 1-3 | " | " | III-2 | 25 | 119 | 119 | 119 | 0.05 | 0.05 | 0.05 | 4 | 4 | 4 | Y |
| 1-4 | " | " | III-5 | " | 119 | 119 | 120 | 0.05 | 0.05 | 0.05 | 4 | 4 | 4 | Y |
| 1-5 | I-2 | " | — | — | 101 | 104 | 105 | 0.06 | 0.07 | 0.07 | 3 | 3 | 2 | X |
| 1-6 | " | " | III-2 | 25 | 117 | 117 | 117 | 0.06 | 0.06 | 0.06 | 4 | 4 | 4 | Y |
| 1-7 | " | " | III-5 | " | 116 | 117 | 117 | 0.06 | 0.06 | 0.06 | 4 | 4 | 4 | Y |
| 1-8 | I-5 | " | — | — | 100 | 102 | 102 | 0.04 | 0.06 | 0.07 | 3 | 3 | 3 | X |
| 1-9 | " | " | III-1 | 25 | 120 | 119 | 119 | 0.04 | 0.05 | 0.05 | 4 | 4 | 4 | Y |
| 1-10 | " | " | III-2 | " | 119 | 119 | 119 | 0.04 | 0.04 | 0.04 | 4 | 4 | 4 | Y |
| 1-11 | " | " | III-5 | " | 119 | 119 | 118 | 0.04 | 0.04 | 0.04 | 5 | 4 | 4 | Y |
| 1-12 | I-6 | " | — | — | 104 | 101 | 102 | 0.06 | 0.07 | 0.08 | 4 | 3 | 3 | X |
| 1-13 | " | " | III-1 | 25 | 119 | 119 | 120 | 0.06 | 0.06 | 0.06 | 4 | 4 | 4 | Y |
| 1-14 | " | " | III-2 | " | 120 | 120 | 120 | 0.06 | 0.06 | 0.06 | 5 | 5 | 4 | Y |
| 1-15 | " | " | III-5 | " | 120 | 120 | 120 | 0.06 | 0.06 | 0.06 | 4 | 4 | 4 | Y |

X: Comparative Example,
Y: Present Invention

EXAMPLE 2

A graphic art film coated with a silver chlorobromide emulsion was exposed to light in the same manner as in Example 1. The exposed film was developed at 38° C. for 13 seconds using a developing solution 2 having the following composition and to which the compound represented by Formula I as shown in Table 2 was added. Fixing was carried out in the same manner as in Example 1.

The emulsion used in the graphic art film was comprised of silver chlorobromide grains containing 90 mol % of silver chloride and the grain had a area ratio of (100) face to (111) face of 100:0.

| Developing solution 2 | |
|---|---|
| Potassium sulfite | 49.5 g |
| Sodium ethylenediaminetetraacetate | 2 g |
| Potassium hydroxide | 3 g |
| Diethylene glycol | 100 g |
| Phenidone | 0.2 g |
| 1-Phenyl-5-mercaptotetrazole | 0.02 g |
| Potassium bromide | 2.5 g |
| Hydroquinone | 15 g |
| Potassium carbonate | 66 g |
| Compound of Formula I | as shown in Table 2 |
| Compound of Formula II | as shown in Table 2 |
| 90% acetic aid | 0.3 mΩ |

Made up to 1 l by adding pure water (ion-exchanged water).

All the resulting developing solutions had a pH ranging from 10.5 to 10.7.

Evaluation was made in the same manner as in Example 1.

Results obtained are shown in Table 2.

TABLE 2

| Developing solution | Compound of Formula I No. | Compound of Formula I Amount mg/Ω | Compound of Formula III No. | Compound of Formula III Amount mg/Ω | Speed Start day | Speed 7th day | Speed 14th day | Fog Start day | Fog 7th day | Fog 14th day | Dot quality Start day | Dot quality 7th day | Dot quality 14th day | Remarks |
|---|---|---|---|---|---|---|---|---|---|---|---|---|---|---|
| 2-1 | — | — | — | — | 112 | 110 | 109 | 0.10 | 0.10 | 0.10 | 4 | 4 | 4 | X |
| 2-2 | I-1 | 200 | — | — | 100 | 98 | 96 | 0.05 | 0.05 | 0.06 | 3 | 3 | 4 | X |
| 2-3 | " | " | III-3 | 30 | 120 | 120 | 120 | 0.05 | 0.05 | 0.05 | 4 | 4 | 4 | Y |
| 2-4 | " | " | III-5 | " | 120 | 119 | 119 | 0.05 | 0.05 | 0.05 | 4 | 4 | 4 | Y |
| 2-5 | " | " | III-8 | — | 121 | 121 | 120 | 0.05 | 0.05 | 0.05 | 4 | 4 | 4 | Y |
| 2-6 | " | " | III-10 | " | 119 | 119 | 119 | 0.05 | 0.05 | 0.05 | 4 | 4 | 4 | Y |
| 2-7 | " | " | III-12 | " | 119 | 119 | 119 | 0.05 | 0.05 | 0.06 | 4 | 4 | 4 | Y |
| 2-8 | " | " | III-14 | — | 119 | 119 | 119 | 0.05 | 0.05 | 0.06 | 4 | 4 | 3 | Y |
| 2-9 | I-2 | 150 | — | — | 96 | 93 | 90 | 0.04 | 0.04 | 0.05 | 3 | 3 | 3 | X |
| 2-10 | " | " | III-3 | 20 | 116 | 116 | 116 | 0.04 | 0.04 | 0.04 | 4 | 4 | 3 | Y |
| 2-11 | " | " | III-5 | " | 115 | 115 | 114 | 0.04 | 0.04 | 0.04 | 4 | 4 | 4 | Y |
| 2-12 | " | " | III-8 | — | 115 | 115 | 115 | 0.04 | 0.04 | 0.04 | 4 | 4 | 4 | Y |
| 2-13 | " | " | III-10 | — | 116 | 115 | 115 | 0.04 | 0.04 | 0.04 | 4 | 4 | 4 | Y |
| 2-14 | " | " | III-12 | " | 114 | 114 | 114 | 0.04 | 0.04 | 0.04 | 4 | 4 | 4 | Y |
| 2-15 | " | " | III-14 | " | 114 | 114 | 114 | 0.04 | 0.04 | 0.05 | 4 | 4 | 3 | Y |
| 2-16 | I-3 | 150 | — | — | 97 | 96 | 95 | 0.04 | 0.04 | 0.04 | 3 | 3 | 3 | X |
| 2-17 | " | " | III-3 | 20 | 117 | 117 | 117 | 0.04 | 0.04 | 0.05 | 4 | 3 | 3 | Y |
| 2-18 | " | " | III-5 | " | 117 | 117 | 117 | 0.04 | 0.04 | 0.05 | 4 | 3 | 3 | Y |
| 2-19 | " | " | III-8 | " | 116 | 115 | 115 | 0.04 | 0.04 | 0.04 | 4 | 4 | 3 | Y |
| 2-20 | " | " | III-10 | " | 116 | 115 | 115 | 0.04 | 0.04 | 0.04 | 4 | 4 | 3 | Y |
| 2-21 | " | " | III-12 | " | 115 | 115 | 115 | 0.04 | 0.04 | 0.04 | 4 | 4 | 3 | Y |
| 2-22 | " | " | III-14 | " | 115 | 115 | 115 | 0.04 | 0.04 | 0.04 | 4 | 4 | 4 | Y |
| 2-23 | I-4 | 200 | — | — | 101 | 100 | 95 | 0.05 | 0.05 | 0.06 | 3 | 3 | 3 | X |
| 2-24 | " | " | III-10 | 25 | 120 | 120 | 120 | 0.05 | 0.05 | 0.05 | 4 | 4 | 3 | Y |
| 2-25 | " | " | III-12 | " | 118 | 118 | 117 | 0.05 | 0.05 | 0.05 | 4 | 4 | 3 | Y |
| 2-26 | " | " | III-14 | " | 118 | 118 | 118 | 0.05 | 0.05 | 0.05 | 4 | 4 | 3 | Y |
| 2-27 | I-5 | " | — | — | 98 | 95 | 93 | 0.04 | 0.04 | 0.05 | 3 | 3 | 3 | X |
| 2-28 | " | " | III-10 | 25 | 114 | 114 | 114 | 0.04 | 0.04 | 0.04 | 4 | 4 | 3 | Y |
| 2-29 | " | " | III-12 | " | 114 | 114 | 114 | 0.04 | 0.04 | 0.05 | 4 | 4 | 3 | Y |
| 2-30 | " | " | III-14 | " | 115 | 115 | 115 | 0.04 | 0.05 | 0.04 | 4 | 4 | 3 | Y |

X: Comparative Example,
Y: Present Invention

EXAMPLE 3

Film samples were obtained in the following manner.

Preparation of back-surface under layer coating solution

After 500 g of gelatin was dissolved in 8 l of water, the following antihalation dyes (A), (B) and (C) were added so that the coating weights of the dyes were 80 mg/m², 50 mg/m² and 100 mg/m², respectively. Further added were 20 g of saponin and 1 g of sodium salt of bis-(2-ethylhexyl)sulfosuccinic acid ester as surface active agents, 20 g of a butyl acrylate/vinylidene chloride copolymer as a polymer latex, 2.5 g of a styrene/maleic anhydride copolymer as a thickening agent, and 2 g of glyoxal as a hardening agent. The coating solution was thus prepared.

(A)

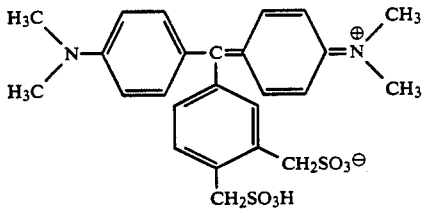

(B)

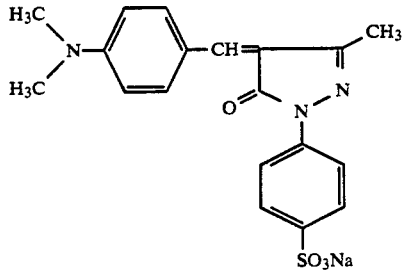

-continued

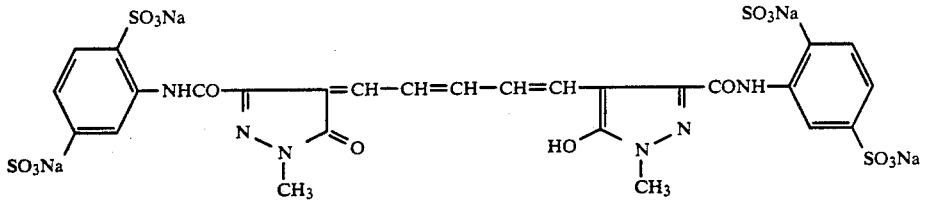

(C)

Preparation of back-surface upper layer coating solution

After 400 g of gelatin was dissolved in 600 ml of water, 20 g of polymethyl methacrylate with an average particle diameter of 5.5 μm as a matting agent and 3 g of sodium salt of bis-(2-ethylhexyl)sulfosuccinic acid ester as a surface active agent were added. The coating solution was thus prepared.

Preparation of emulsion layer coating solution

In a container containing gelatin and sodium chloride and heated to 40° C., an aqueous solution of silver nitrate and an aqueous mixed solution comprising potassium bromide and sodium chloride to which $5\times10^{-7}$ mol of potassium hexachloroiridate and $6\times10^{-8}$ of potassium hexabromorhodate were added, were added by double-jet precipitation. Silver chlorobromide grains containing 35 mol % of silver bromide were thus prepared while maintaining the pH to 3.0 and the pAg to 7.7. After the pH was returned to 5 9, desalting was carried out by a conventional method. The silver halide grains thus obtained were comprised of cubic grains with a degree of monodispersion of 9% and an average grain size of 0.25 μm, and the grain had an area ratio of (100) face to (111) face of 98:2.

The emulsion thus obtained was subjected to gold sensitization and sulfur sensitization, a sensitizing dye (a) was thereafter added in an amount of 60 mg per mole of silver halide, and then 70 mg of 1-phenyl-5-mercaptotetrazole per mol of silver halide, 1.2 g of 4-hydroxy-6-methyl-1,3,3a,7-tetrazaindene per mol of silver halide, and gelatin were added to stop the chemical ripening. Thereafter, 4 g of hydroquinone, 3 g of potassium bromide, 5 g of saponin, 2 g of a styrene/maleic acid copolymer and 3 g of a high-molecular polymer latex of ethyl acrylate were further added, and then sodium 1-hydroxy-3,5-dichlorotriazine was added as a hardening agent. The desired coating solution was thus prepared.

Sensitizing dye (a)

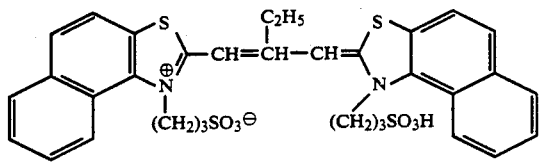

Preparation of protective layer coating solution

In an aqueous solution of 500 g of gelatin, 10 g of potassium bromide and 4 g of sodium 1-decyl 2-(3-isopentyl)succinato-2-sulfonate were added, and then 100 g of amorphous silica having an average particle diameter of 5 μm was added and dispersed. The coating solution thus prepared.

Using the above coating solutions, a 100 μm thick polyethylene terephthalate film base was provided with a back-surface under layer and a back-surface upper layer by simultaneous multilayer coating, and subsequently, on its opposite side to the back-surface layers, provided with an emulsion layer and a protective layer by simultaneous multilayer coating.

The coating weight of silver was 3.8 g/m² and the gelatin was in an amount of 1.8 g/m² for the emulsion layer and 1.0 g g/m² for the protective layer.

Samples thus obtained were exposed to light through a contact screen in the same manner as Example 1, and processed by means of a usual roller-type automatic processor under the following conditions.

| Step | (Developing conditions) Temperature | Time |
|---|---|---|
| Developing | 38° C. | 12.4 to 20 seconds |
| Fixing | 34° C. | 9.9 seconds |
| Washing | room temperature | 10.6 seconds |
| Drying | 50° C. | 13.9 seconds |

Processing was carried out using the same developing solution as the developing solution 1 as in Example 1 to which the compound of Formula I was added. The compound of Formula I was added as shown in Table I, in an amount as also shown in Table 1. Further, developing solutions each having various pH values as shown in Table 3 were prepared by controlling the amount of potassium hydroxide.

Subsequently, a developing solution was prepared by adding in the developing solution 1 the thioether compound of Formula III as shown in Table 3.

Results obtained by sensitometry are shown in Table 3. The speed is expressed as a relative speed regarding as 100 the speed obtained using the developing solution No. 3-1 shown in Table 3.

Running stability was evaluated in the same manner as in Example 1.

TABLE 3

| Developing solution | Compound of Formula I No. | Compound of Formula I Amount mg/Ω | Compound of Formula III No. | Compound of Formula III Amount mg/Ω | Speed Start day | Speed 7th day | Speed 14th day | Fog Start day | Fog 7th day | Fog 14th day | ph of developing solution | Processing time (sec) | Remarks |
|---|---|---|---|---|---|---|---|---|---|---|---|---|---|
| 3-1 | I-2 | 300 | — | — | 100 | 100 | 107 | 0.05 | 0.05 | 0.06 | 10.77 | 20 | X |
| 3-2 | " | 150 | — | — | 103 | 104 | 105 | 0.05 | 0.06 | 0.07 | " | 12.4 | X |

TABLE 3-continued

| Developing solution | Compound of Formula I No. | Compound of Formula I Amount mg/Ω | Compound of Formula III No. | Compound of Formula III Amount mg/Ω | Speed Start day | Speed 7th day | Speed 14th day | Fog Start day | Fog 7th day | Fog 14th day | ph of developing solution | Processing time (sec) | Remarks |
|---|---|---|---|---|---|---|---|---|---|---|---|---|---|
| 3-3 | " | " | III-2 | 25 | 116 | 116 | 116 | 0.05 | 0.05 | 0.05 | 10.78 | " | Y |
| 3-4 | " | " | III-5 | " | 115 | 115 | 115 | 0.05 | 0.05 | 0.06 | " | " | Y |
| 3-5 | " | " | III-7 | " | 117 | 117 | 117 | 0.05 | 0.05 | 0.05 | " | " | Y |
| 3-6 | I-5 | 300 | — | — | 101 | 104 | 109 | 0.05 | 0.05 | 0.06 | 10.77 | 20 | X |
| 3-7 | " | 150 | — | — | 104 | 106 | 110 | 0.06 | 0.06 | 0.08 | " | 12.4 | X |
| 3-8 | " | " | III-2 | 25 | 117 | 117 | 117 | 0.06 | 0.06 | 0.06 | 10.78 | " | Y |
| 3-9 | " | " | III-5 | " | 117 | 117 | 117 | 0.06 | 0.06 | 0.06 | " | " | Y |
| 3-10 | " | " | III-7 | " | 116 | 116 | 116 | 0.06 | 0.06 | 0.06 | " | " | Y |
| 3-11 | I-6 | 300 | — | — | 104 | 106 | 109 | 0.05 | 0.05 | 0.07 | 10.77 | 20 | X |
| 3-12 | " | 150 | — | — | 107 | 110 | 113 | 0.05 | 0.06 | 0.07 | " | 12.4 | X |
| 3-13 | " | " | III-2 | 25 | 121 | 121 | 121 | 0.05 | 0.05 | 0.05 | 10.79 | " | Y |
| 3-14 | " | " | III-5 | " | 120 | 120 | 120 | 0.05 | 0.05 | 0.06 | " | " | Y |
| 3-15 | " | " | III-7 | " | 120 | 120 | 120 | 0.05 | 0.05 | 0.05 | " | " | Y |

X: Comparative Example,
Y: Present Invention

EXAMPLE 4

Three kinds of emulsions were prepared in the same manner as in Example 3 except that they were each varied in the area ratio of (110) to (111) as shown in Table 4 by control of pAg value and use of a grain growing controlling agent. Samples were prepared each using thus obtained emulsions and processed in the same manner as in Example 3. In the processing, developing solution 3-3 of Example 3 was used which contained 150 mg/l of compound I-2 and 25 mg/l of compound III-5 and had a pH value of 10.78. Development was carried out for 12.4 seconds.

TABLE 4

| Area ratio (100)/(111) | Speed Start day | Speed 7th day | Speed 14th day | Fog Start day | Fog 7th day | Fog 14th day |
|---|---|---|---|---|---|---|
| 100/0 | 121 | 122 | 121 | 0.04 | 0.04 | 0.04 |
| 90/10 | 110 | 112 | 108 | 0.05 | 0.05 | 0.05 |
| 80/20 | 82 | 75 | 73 | 0.07 | 0.08 | 0.06 |

EXAMPLE 5

In a container containing gelatin and sodium chloride and heated to 40° C., an aqueous solution of silver nitrate and an aqueous mixed solution comprising potassium bromide and sodium chloride to which $5\times10^{-7}$ mol of potassium hexachloroiridate and $6\times10^{-8}$ of potassium hexabromorhodate were added, were added by double-jet precipitation. Silver chlorobromide grains containing 35 mol % of silver bromide were thus prepared while maintaining the pH to 3.0 and the pAg to 7.7. After the pH was returned to 5.9, desalting was carried out by a conventional method. The silver halide grains thus obtained were comprised of cubic grains with a degree of monodispersion of 9% and an average grain size of 0.25 μm.

The emulsion thus obtained was subjected to gold sensitization and sulfur sensitization, a sensitizing dye (a) was thereafter added in an amount of 240 mg per mole of silver halide, and then 70 mg of 1-phenyl-5-mercaptotetrazole per mol of silver halide, 1.2 g of 4-hydroxy-6-methyl-1,3,3a,7-tetrazaindene, and gelatin were added to stop the chemical ripening. Thereafter. 4 g of hydroquinone, 3 g of potassium bromide, 5 g of saponin, 2 g of a styrene/maleic acid copolymer and 3 g of a high-molecular polymer latex of ethyl acrylate, all per mol of silver halide, were further added, and then sodium 1-hydroxy-3,5-dichlorotriazine and formalin were added as a hardening agent.

The resulting emulsion was coated on a subbed polyethylene terephthalate film base so as to give a silver weight of 4.3 g/m$^2$ and a gelatin weight of 2.5 g/m$^2$, and the same protective layer coating solution as the one prepared in Example 3 was further coated so as to give a gelatin weight of 1.0 g/m$^2$. An emulsion layer and a protective layer was thus provided by simultaneous coating.

On the opposite side to the surface on which the above solutions were coated, a gelatin solution containing dyes (b) and (c) had been previously coated so as to give a gelatin weight of 3.3 g/m$^2$; dye (b), 180 mg/m$^2$; and dye (c), 50 mg/m$^2$.

Dye (b)

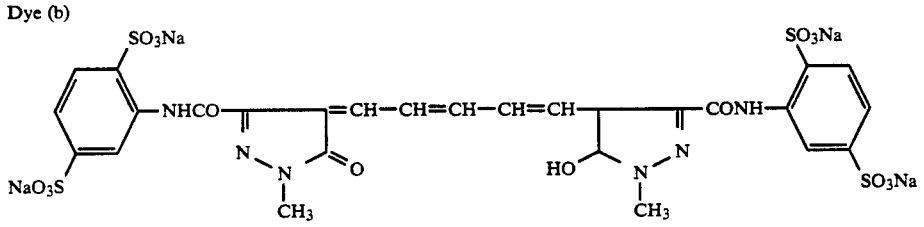

Dye (c)

-continued

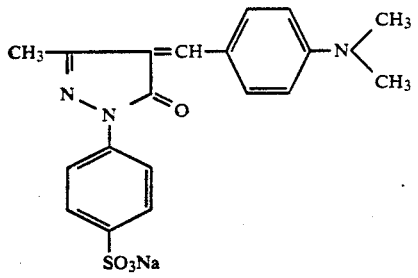

Samples thus obtained were processed and evaluated in the same manner as in Example 3 except that in the developing solution the compound of Formula I used in Example 3 was replaced with the compound of Formula II. The composition of each developing solution and the results of evaluation are shown in Table 5. The developing solutions all had a pH ranging from 10.7 to 10.8.

TABLE 5

| Developing solution | Compound of Formula I No. | Compound of Formula I Amount mg/Ω | Compound of Formula III No. | Compound of Formula III Amount mg/Ω | Speed Start day | Speed 7th day | Speed 14th day | Fog Start day | Fog 7th day | Fog 14th day | Dot quality Start day | Dot quality 7th day | Dot quality 14th day | Remarks |
|---|---|---|---|---|---|---|---|---|---|---|---|---|---|---|
| 4-1 | — | — | — | — | 110 | 110 | 110 | 0.11 | 0.11 | 0.11 | 4 | 4 | 4 | X |
| 4-2 | II-2 | 170 | — | — | 100 | 103 | 105 | 0.04 | 0.05 | 0.05 | 4 | 4 | 3 | X |
| 4-3 | II-2 | 170 | III-5 | 30 | 136 | 135 | 135 | 0.04 | 0.04 | 0.04 | 5 | 5 | 5 | Y |
| 4-4 | II-2 | 170 | III-9 | 30 | 140 | 140 | 140 | 0.04 | 0.05 | 0.05 | 5 | 5 | 5 | Y |
| 4-5 | II-2 | 170 | III-13 | 30 | 140 | 140 | 140 | 0.04 | 0.04 | 0.04 | 5 | 5 | 5 | Y |
| 4-6 | II-4 | 150 | — | — | 98 | 103 | 106 | 0.04 | 0.06 | 0.07 | 3 | 3 | 2 | X |
| 4-7 | II-4 | 150 | III-3 | 25 | 142 | 142 | 142 | 0.04 | 0.04 | 0.05 | 4 | 4 | 4 | Y |
| 4-8 | II-4 | 150 | III-5 | 25 | 140 | 140 | 140 | 0.04 | 0.04 | 0.04 | 4 | 4 | 4 | Y |
| 4-9 | II-4 | 150 | III-9 | 30 | 144 | 144 | 143 | 0.04 | 0.04 | 0.04 | 4 | 4 | 4 | Y |
| 4-10 | II-4 | 150 | III-13 | 30 | 145 | 144 | 144 | 0.04 | 0.04 | 0.04 | 4 | 4 | 4 | Y |
| 4-11 | II-5 | 120 | — | — | 101 | 106 | 109 | 0.04 | 0.06 | 0.07 | 4 | 4 | 3 | X |
| 4-12 | II-5 | 120 | III-3 | 25 | 145 | 145 | 145 | 0.04 | 0.04 | 0.04 | 5 | 5 | 5 | Y |
| 4-13 | II-5 | 120 | III-5 | 25 | 145 | 145 | 145 | 0.04 | 0.04 | 0.04 | 5 | 5 | 5 | Y |
| 4-14 | II-5 | 120 | III-9 | 30 | 146 | 146 | 146 | 0.04 | 0.04 | 0.04 | 5 | 5 | 5 | Y |
| 4-15 | II-5 | 120 | III-13 | 30 | 149 | 149 | 149 | 0.04 | 0.04 | 0.04 | 5 | 5 | 3 | Y |

X: Comparative Example,
Y: Present Invention

What is claimed is:

1. An image forming method comprising steps of imagewise exposing a silver halide photographic light-sensitive material comprising silver halide grains having a ratio of (100) surface to (111) surface of not less than 5 to light, and developing said silver halide photographic light-sensitive material with a developer comprising a compound represented by the following formula I or II:

(I)

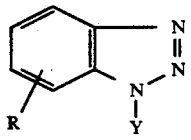

(II)

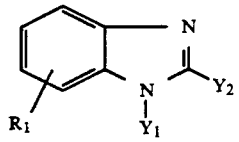

wherein Y, $Y_1$ and $Y_2$ are each a hydrogen atom or a mercapto group, R and $R_1$ are each a hydrogen atom, a halogen atom, a nitro group, an amino group, a cyano group, a hydroxyl group, a mercapto group, a sulfo group, a substituted or unsubstituted alkyl group, a substituted or unsubstituted alkenyl group, a substituted or unsubstituted alkinyl group, a substituted or unsubstituted aryl group, a substituted or unsubstituted alkoxy group, a hydroxycarbonyl group, an alkylcarbonyl group or an alkoxycarbonyl group, and a compound represented by the following formula III:

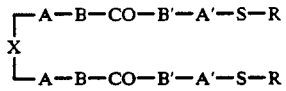

(III)

wherein A is an alkylene group having 1 to 3 carbon atoms, or a polyalkylene ether group represented by $-(CH_2CH_2O)p-$, $-(CH_2CH_2O)p-CH_2-CH_2-$ or

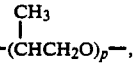

which is linked through the carbon atom thereof with B; A' is an alkylene group having 1 to 3 carbon atoms, or a polyalkylene ether group represented by $-(CH_2CH_2O)p-CH_2-CH_2-$ or

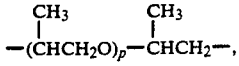

provided that both of A and A′ are not a polyalkylene ether group at the same time and p is an integer of 2 to 30; B and B′ are independently —NH— or —O—, provided that both of B and B′ are not —O— at the same time; R is an alkyl group having 1 to 3 carbon atoms, a phenyl group, an aralkyl group or a —$(CH_2)_q$-COOR′ group, in which q is an integer of 1 to 3 and R′ is an alkyl group having 1 to 3 carbon atoms; X is —S—, —O—, —$CH_2$—,

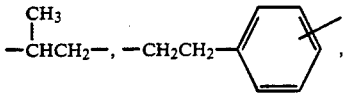

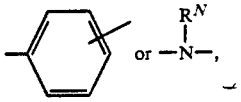

in which —$R^n$ is an alkyl group having 1 to 3 carbon atoms.

2. A method of claim 1, wherein said compound represented by Formula I or II is contained in said developer in an amount of from 0.0001 g to 2 g per liter of the developer.

3. A method of claim 1, wherein said comound represented by Formula III is contained in said developer in an amount of from 0.0001 g to 2 g per liter of the developer.

4. A method of claim 3, wherein said compound represented by Formula III is contained in said developer in an amount of from 0.001 g to 1 g per liter.

5. A method of claim 1, wherein the pH value of said developer is within the range of from 9 to 13.

6. A method of claim 5, wherein the pH value of said developer is within the range of from 9.5 to 12.

7. A method of claim 1, wherein said silver halide photographic light-sensitive material comprises a silver halide grains containing not less than 50 mol % of silver chloride.

8. A method of claim 1, wherein said silver halide photographic light-sensitive material comprises a silver halide grains having a size of from 0.2 μm to 0.5 μm.

9. A method of claim 1, wherein said developing step is performed for a time of not more than 20 seconds.

10. A method of claim 9, wherein said developing step is performed for a time of not more than 15 seconds.

11. The method of claim 1, wherein said developing is performed for a time of 20 seconds or less.

12. The method of claim 11, wherein said developing is performed for a time of from 6 seconds to 15 seconds.

* * * * *